United States Patent
Henninger et al.

(10) Patent No.: US 10,082,176 B2
(45) Date of Patent: Sep. 25, 2018

(54) STRUCTURAL ELEMENT HAVING AT LEAST ONE SLIDE SURFACE

(71) Applicants: Frank Henninger, Grafenrheinfeld (DE); Andreas Vierling, Schonungen (DE)

(72) Inventors: Frank Henninger, Grafenrheinfeld (DE); Andreas Vierling, Schonungen (DE)

(73) Assignee: AKTIEBOLAGET SKF, Gothenburg (SE)

( * ) Notice: Subject to any disclaimer, the term of this patent is extended or adjusted under 35 U.S.C. 154(b) by 289 days.

(21) Appl. No.: 14/950,242

(22) Filed: Nov. 24, 2015

(65) Prior Publication Data
US 2016/0153493 A1 Jun. 2, 2016

(30) Foreign Application Priority Data

Nov. 27, 2014 (DE) .................. 10 2014 224 304

(51) Int. Cl.
*F16C 33/20* (2006.01)
*D02G 3/44* (2006.01)

(52) U.S. Cl.
CPC .......... *F16C 33/201* (2013.01); *D02G 3/447* (2013.01); *F16C 33/206* (2013.01);
(Continued)

(58) Field of Classification Search
CPC ......... F16C 33/18; F16C 33/20–33/208; F16C 2208/30; F16C 2208/58; F16C 2208/60; F16C 2208/62; F16C 2208/70; F16C 2208/76; F16C 2208/82; D01F 8/00; D01F 8/04–8/16; D01F 8/18; Y10T 428/2929; Y10T 428/2931; Y10T 442/3146; Y10T 442/3154; Y10T 442/3163;
(Continued)

(56) References Cited

U.S. PATENT DOCUMENTS 3,844,195 A * 10/1974 Rhodes .................. D02G 3/447 384/300
4,163,825 A * 8/1979 Wimmer .................. D01F 6/12 277/919

(Continued)

FOREIGN PATENT DOCUMENTS

DE 60017293 T2 12/2005
EP 0585874 A1 3/1994

*Primary Examiner* — Vincent Tatesure
(74) *Attorney, Agent, or Firm* — Bryan Peckjian; SKF USA Inc. Patent Dept.

(57) ABSTRACT

A structural element has at least one slide layer and is formed to slide via the at least one slide layer along at least one line of motion. The slide layer includes a fiber-reinforced material containing at least one multi-component fiber that includes at least one first component, which is disposed in or on at least one first structure, and at least one second component, which is disposed in or on at least one second structure. The first and second structures are materially-bonded together and are disposed parallel to each other in a main extension direction of the at least one multi-component fiber. Either the first component or the second component is polytetrafluoroethylene. The structural element may be formed, e.g., as a bearing ring, a slide bearing bushing, a linear guide or a spherical bearing ring.

20 Claims, 4 Drawing Sheets

(52) U.S. Cl.
CPC ...... *F16C 2208/02* (2013.01); *F16C 2208/32* (2013.01); *F16C 2208/86* (2013.01); *F16C 2240/40* (2013.01)

(58) Field of Classification Search
CPC ........... Y10T 442/3171; Y10T 442/637; Y10T 442/638; Y10T 442/64; Y10T 442/641; Y10T 442/642
USPC ................ 384/297, 298, 300; 428/373, 374; 442/199, 200, 201, 202, 361, 362, 363, 442/364, 365
See application file for complete search history.

(56) References Cited

U.S. PATENT DOCUMENTS

| | | | | |
|---|---|---|---|---|
| 5,631,085 A | * | 5/1997 | Gebauer | ................ D02G 3/447 428/357 |
| 2001/0016091 A1 | * | 8/2001 | Mesing | ................ F01D 17/162 384/300 |
| 2013/0302609 A1 | | 11/2013 | Bongaerts et al. | |

\* cited by examiner

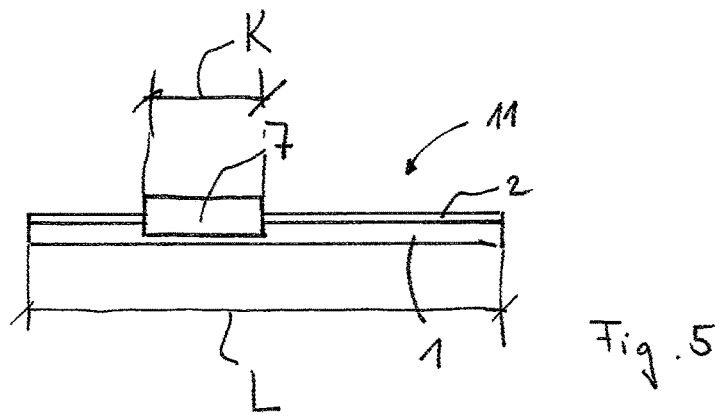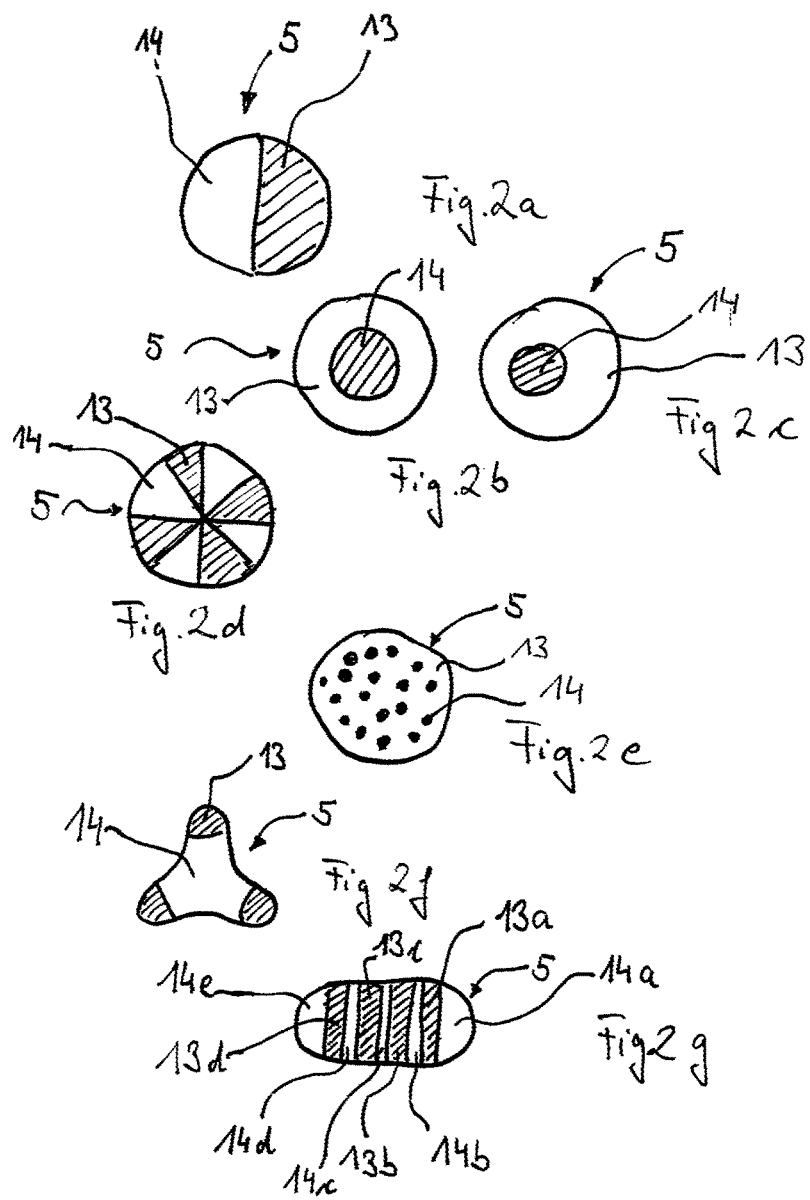

STRUCTURAL ELEMENT HAVING AT LEAST ONE SLIDE SURFACE

CROSS-REFERENCE

This application claims priority to German patent application no. 10 2014 224 304.1 filed on Nov. 27, 2014, the contents of which are fully incorporated herein by reference.

TECHNICAL FIELD

The present invention generally relates to structural elements comprising at least one slide surface (layer).

BACKGROUND

Slide layers or structural elements having slide layers (slide surfaces) are utilized in a wide variety of applications, such as slide bearings, linear systems, linear guides, linear slide guides, etc., and they may be designed, e.g., as plate-shaped (flat surfaces), as bushings (sleeves) or as spherical plain bearings (e.g., as curved surfaces). In addition to other materials, fiber-reinforced synthetic materials (plastics), e.g., fiber-reinforced composite slide materials or wound bushings, are used as materials for conventional glide surfaces. These can be dry-lubricated, as well as wet-lubricated, slide materials, which can be utilized in many variations.

For the manufacture of conventional slide bearings or slide layers, often pure PTFE-yarns containing reinforcement fibers of various origins, for example glass or aramid, are interwoven or wound. They can then be impregnated with a matrix made of a matrix material (e.g., an adhering polymer, such as an epoxy resin matrix). In some slide layers, friction-reducing or wear-reducing additives are also introduced into the matrix. In certain embodiments, PTFE-heteroyarns, e.g., made of mixed filament yarns, are utilized. This approach leads in many cases to a gradual build-up, i.e. to a differing distribution of the friction-reducing and/or reinforcing structural elements in the slide material, e.g., in the thickness direction.

Moreover, fiber-reinforced materials, which comprise only PTFE as fibers, can exhibit, in some cases, insufficient mechanical stability for use as a slide layer. PTFE can possibly have the strongest anti-adhesive properties among all polymers. In certain embodiments, good friction-reducing, self-lubricating properties can thus be derived from PTFE. Nevertheless, it can also possibly happen that PTFE, independent of whether it is in particle- or fiber-form, can bind to or in a matrix or a matrix material only to a limited extent. In unfavorable conditions, a sufficient fiber-matrix adhesion can not be achieved. However, it is possible that the fiber-matrix adhesion is essential to ensuring a satisfactory mechanical stability of the fiber-reinforced material or the slide layer.

SUMMARY

Therefore, there is a need to improve a compromise between slide properties and mechanical stability of a slide layer. A structural element having a slide layer according to the present teachings takes into account this need.

Exemplary embodiments of the present teachings relate to a structural element having at least one slide layer. The structural element can slide via the slide layer along at least one line of motion. The slide layer comprises a fiber-reinforced material containing one or more multi-component fibers. The (each) multi-component fiber comprises at least one first component, which is disposed in or as at least one first structure, and a second component, which is disposed in or as at least one second structure. The first and the second structures are materially-bonded with each other and are preferably disposed in parallel to each other in a main extension direction of the multi-component fiber, wherein either the first component or the second component is PTFE. In some exemplary embodiments, it is thus possible that the slide layer exhibits improved mechanical stability, which can be achieved, e.g., because the multi-component fiber includes, in addition to the PTFE as the first or second component, yet another material that can enter into (facilitate) a better bonding (connection) with the matrix material.

A fiber and thus also a multi-component fiber can be, e.g., one element or one structural element that has a substantially larger dimension in one direction, namely its main extension direction, than in a second and in a third direction, wherein the three directions span (define) a three-dimensional coordinate system. The dimension of the fiber in the first direction can be greater by at least a factor of 100, 1000, 10000 or 100000, than in the two other directions. That is, the fiber may preferably have an aspect ratio of at least 100, e.g., at least 1000, e.g., at least 10000 or e.g., at least 100000.

Along the main dimension or main extension direction, the fiber can have, e.g., the same (e.g. non-varying or constant) or at least a substantially similar cross-section. A multi-component fiber can, e.g., include at least two structures. The structures can be materially-bonded with each other, e.g., by one or more of adhesion forces, fusion, covalent bonds, hydrogen bonding, van der Waals forces. For example, the structures, which are materially-bonded with each other, can comprise different materials or components. In certain embodiments, the at least two structures are directly materially-bonded with each other without other components, such as adhesive or matrix material. Such a multi-component fiber can thereby differ, for example, from a yarn that includes at least two fibers, which are spun or twisted around each other and/or which are bonded to each other via a matrix material. The first and/or the second components can thus be all possible materials or mixtures. For example, the other component, which is not PTFE (abbreviation of polytetrafluoroethylene) can comprise an admixture of PTFE. In certain embodiments, the other component can also be PTFE-free. The other components can comprise, e.g., any organic or inorganic material, e.g., a synthetic material (plastic), for example polyamide (PA), polypropylene (PP), polycarbonate (PC) and/or polyester (PES).

A structure can thus be any structural element or element that comprises the first or the second component or is manufactured entirely from it. Along its main extension direction, the structure can have, e.g., an essentially constant or similar cross-section. An essentially constant or similar cross-section can possibly include cross-sections that deviate from each other by up to 5% in each direction. Two structural elements or structures, which are disposed parallel to each other along the main extension direction of the fiber, can both extend, e.g., parallel to the main extension direction of the fiber so that the multi-component fiber comprises at least two structures of different components at each cross-section. For example, the fiber can be a bi-component fiber that comprises two different components.

In some exemplary embodiments, the multi-component fiber can have the same cross-section along its main extension direction or at least in one region of the main extension direction. The region can correspond, e.g., to at least 10%, 20%, 50%, 70% or 80% of a characteristic dimension of the slide layer along at least one line of motion. In the cross-section, the at least two structures can thus also be disposed always the same, e.g., the cross-section of the two or more structures remains unchanged along the axial direction of the fiber. In some embodiments, the multi-component fiber can thereby differ from a yarn. In a yarn, the fibers are not disposed parallel to one another over wide distances, but rather are spun, twisted or the like with or around one another.

In addition, the multi-component fiber can have a length that is larger than at least 1% of a characteristic dimension of the slide layer along the line of motion. In some embodiments, a homogenous texture of the layer can thereby be achieved, because the multi-component fiber is present in the fiber-reinforced material as a long fiber and not as a snippet or short fiber. The length of the multi-component fiber is related to the intended usage and/or to the structural element size or to the dimension of the slide layer. Because these values or dimensions can significantly differ from one another depending upon the intended purpose or nature of the structural element, the length of the multi-component fiber is provided with reference to a characteristic dimension of the slide layer along the at least one line of motion. The characteristic dimension of the slide layer along the at least one line of motion can be, e.g., a length and/or a width of the slide layer.

The line of motion can be defined as lying along or parallel to a direction in which the slide layer carries out a movement relative to another structural element. The line of motion can thus be located, e.g., in a plane, i.e. on a flat surface or also on a curved surface, e.g., a spherical outer surface or the like. The movement can possibly be a relative movement between the structural element having the slide layer and another structural element.

For annular structural elements or slide layers, a circumferential length of the ring can be the characteristic dimension when it actually or relatively rotates in a circumferential direction. In addition or in the alternative, in cases in which the ring facilitates sliding along an axial direction, a width of the ring, i.e. a dimension along the axial direction, can represent a characteristic dimension of the ring.

The length of the fiber can also correspond, in accordance with the dimension of the slide layer or when the fiber is not disposed parallel to the line of motion, to at least a dimension of 20% or also more than 30% or 50% of a characteristic dimension of the slide layer along the line of motion. In other exemplary embodiments, for example in which the fiber is offset in or only in a small angle to the line of motion, the fiber can have a length of at least 80%, 90% or even 100% of the characteristic dimension. If the fiber is spun, it can even have a longer length than 100% of the characteristic dimension.

In addition or in the alternative, the multi-component fiber can have a length that corresponds to a dimension of the slide layer along a direction line on which the multi-component fiber is disposed. Such fibers can be also be characterized as continuous fibers. Thus, in some exemplary embodiments, the fibers are not disposed in one direction in a fragmented or discontinuous manner. In certain embodiments, the strength of the slide layer can thus be increased and it is possible to avoid or at least reduce the creation of predetermined breaking points.

In addition or in the alternative, the multi-component fiber can have a diameter between 3 μm and 30 μm. In some exemplary embodiments, it can thus be made possible that sufficient anti-friction or lubricating properties can be provided by the fibers alone.

The multi-component fiber can, in certain embodiments, be disposed as individual fibers or also in a fiber bundle. If appropriate, the multi-component fiber can also be disposed in a yarn. For example, the multi-component fiber can then serve as a filament of the yarn. The yarn can comprise only one multi-component fiber or also a plurality of multi-component fibers or filaments. A yarn may be a linear-shaped textile fabric or a long, thin fabric made out of one or more fibers. Yarns according to the present teachings encompass rovings and tows that comprises a plurality of multi-component fibers according to the present teachings.

Yarns can be differentiated, e.g., in assembled yarns, which are comprised of two or more parallel, wound yarns or fibers that do not twist around each other. Further, there are twisted yarns, which are comprised of a plurality of twisted-together yarns. Filament yarns are a further example for yarns that theoretically comprise endless long fibers, which can be called filaments. Filament yarns need not be twisted; the holding together of the individual filaments can also be provided by swirlings. There are smooth and textured filament yarns. Mono-filaments are comprised of only one filament. Multi-filament yarns, which can also be characterized as multi-fiber yarns, are comprised of many individual fibers.

In some embodiments, the multi-component fiber is disposed in a yarn that has a fineness or yarn count (linear mass density) between 200-1200 dtex. In some embodiments, a sufficient amount of anti-friction agent can thus be introduced into the slide layer. The value "dtex" provides a measure for the fineness or yarn count (linear mass density) of the yarn, namely 1 dtex (short for decitex) equals 0.1 tex or 1 gram per 10000 meters; i.e. 1 tex equals 10 dtex.

Two structures, which comprise the same component, can have the same shape or cross-sectional shape or can have differing cross-sectional shapes. In addition or in the alternative, the first structure and the second structure can, e.g., have the same cross-section. In some exemplary embodiments, it can be made possible that the multi-component fiber is manufacturable in a simple manner and way. For example, at least one of the structures or also the fiber can have, the cross-section of a circle, a semi-circle, a circular segment, a rectangle, a square or the like.

In addition or in the alternative, the first component can be disposed as a matrix and the second component is disposed as a plurality of fibrils. In some exemplary embodiments, one or more mechanical properties of the multi-component fiber can be increased or improved. The fibrils and/or their diameter can be about at least a factor of 5, 10 or even 100 smaller than the diameter of the multi-component fiber.

In some exemplary embodiments, the first component is disposed as the shell and the second component is disposed as the core. In such embodiments, the connection (binding) between the matrix material and the fiber can be improved.

In some exemplary embodiments, the first component is disposed in the form of two layers that lie adjacent to each other perpendicular to the main extension direction and accommodate (sandwich) between them at least one layer of the second component. In some exemplary embodiments, it can be made possible that the multi-component fiber can have different components on its outer surface.

In some exemplary embodiments, the multi-component fiber can have a star-shaped cross-section. For example, the first component can be disposed on or in at least one tip and/or corner of the cross-section and the second component can be disposed in a medial cross-sectional dimension of the multi-component fiber. In some exemplary embodiments, it can be made possible that the multi-component fiber can have a largest possible specific surface area in comparison to its volume and can possibly bind better with the matrix material.

Exemplary embodiments relate to a slide bearing having the structural element according to one of the described exemplary embodiments. For example, the structural element may be a bearing ring or a slide bearing bushing (sleeve or journal). In the alternative, the element can be a linear guide and/or a sled or a carriage in a linear system. A slide bearing can also be a spherical bearing. In such an embodiment, one or more structural elements according to the present teachings is/are designed as a spherical bearing inner ring and/or as a spherical bearing outer ring. In the spherical bearing inner ring, the structural element has a surface, which is curved radially outward, and the slide layer is disposed radially outward. In the spherical bearing outer ring, the structural element has a surface, which is curved radially inward, and the slide layer is disposed radially inward.

The exemplary embodiments disclosed in the following description, claims and in the appended Figures, as well as their individual features, can be of importance and can be implemented individually as well as in any combination for the development of an exemplary embodiment.

BRIEF DESCRIPTION OF THE DRAWINGS

FIGS. 2a to 2g show schematic illustrations of cross-sections of multi-component fibers for a structural element and/or a slide layer according to additional exemplary embodiments.

FIG. 5 shows a schematic illustration of a side view of a structural element, comprising at least one slide layer according to another exemplary embodiment.

DETAILED DESCRIPTION

In the following description of the appended drawings, the same reference numbers are used to denote the same or comparable components. Furthermore, summarizing reference numbers are utilized for components and objects, which occur several times in an exemplary embodiment or in a drawing, but which are commonly described with respect to one or several features. Components or objects, which are described with the same or summarizing reference numbers, can be embodied the same with respect to individual, several or all features, e.g., their dimensions, but also differently, if necessary, as long as something else does not explicitly or implicitly result from the description.

Figure 1:
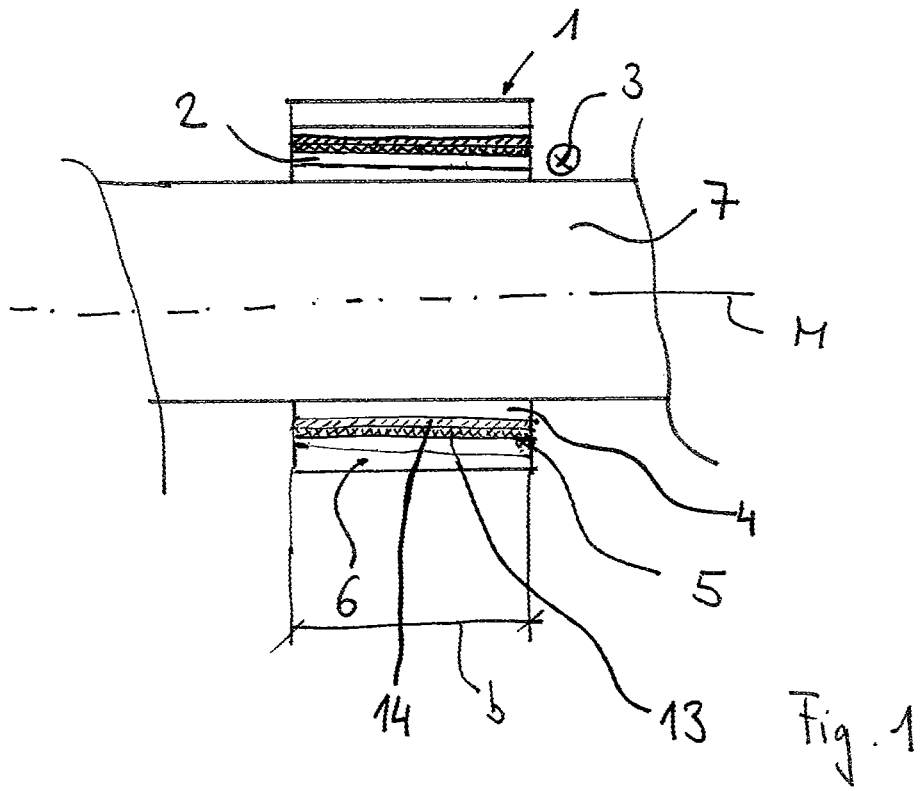
FIG. 1 shows a schematic illustration of a cross-section of a structural element, comprising at least one slide layer according to an exemplary embodiment.

FIG. 1 shows a schematic illustration of a cross-section of a structural element 1, comprising at least one slide layer 2 according to an exemplary embodiment of the present teachings. The structural element 1 is configured in order to slide via the slide layer 2 along at least one line of motion 3. The slide layer 2 comprises a fiber-reinforced material having at least one multi-component fiber 5 that includes at least one first component, which is disposed in at least one first structure 13, and at least one second component, which is disposed in at least one second structure 14. The two structures 13 and 14 are materially-bonded with each other in a main extension direction of the multi-component fiber 5 parallel to each other. Either the first component or the second component is preferably PTFE.

In the embodiment of FIG. 1, the structural element 1 is formed as a slide bearing bushing (sleeve, journal or bush) having a tube-shaped body and is disposed on a shaft that serves as another component 7. The slide layer 2 is disposed radially inward on a tube-shaped base body 6 of the structural element. The structural element 1 can rotate about the other component 7 about a central axis M via the slide layer 2 and/or can slide along the line of motion 3 on the other component 7. Thus, in this embodiment, a circumference of the structural element 1 is a characteristic dimension along the line of motion 3. Alternatively, the structural element 1 can be fixedly disposed, as a component disposed for relative movement thereto, and the other component 7 can move relative to the component 1. In an analogous manner, the structural element 1 as well as the other component 7 can both undergo movements relative to each other.

In the exemplary embodiment of FIG. 1, the multi-component fiber 5 is a bi-component fiber, which comprises exactly two components. As bi-component fiber materials, PTFE serves as the first component for the first structure 13 and another reinforcing component serves as the second structure 14, which can be, e.g., organic or inorganic in origin. The second component can thus be selected in accordance with the field of use, e.g., for cost reduction or to exploit a technical property, for example a mechanical property.

The slide layer 2, which can also be characterized as a fiber-reinforced slide material, comprises a matrix material 4, such as, e.g., an epoxy resin, in addition to the at least one multi-component fiber 5, which also be provided as a PTFE-bicomponent-mono- or multi-filament yarn. The matrix material 4 can be a thermosetting or thermoplastic polymer matrix, in which the multi-component fibers, which are formed as short, long or endless, are embedded. Micro- or nano-scale fillers optionally can be added into the thermosetting or thermoplastic matrix material. In the embodiment of FIG. 1, so-called continuous fibers may be used, which extend in a direction, in which they are disposed, completely through the structural element 1. The at least one multi-component fiber 5 extends in an axial direction M from one structural element side to the other structural element side. In some further, not-illustrated exemplary embodiments, the multi-component fibers or the least one multi-component fiber can, in addition or in the alternative, be disposed also in the circumferential direction as long or continuous fibers. If the structural element 1 and the component 7 were to carry out relative movement to each other in the axial direction, then the characteristic dimension of the slide layer 2 would be a width b of the slide layer 2 along the least one line of motion, i.e. the dimension in the axial direction M.

The at least one multi-component fiber 5 can, in some embodiments, be disposed in a textile fabric and/or can be wound. In certain embodiments, the multi-component fiber 5 can be disposed as individual fibers or also in a fiber bundle. The fiber can also possibly be disposed in a yarn. For example, the fiber can serve as a filament of the yarn. The yarn can comprise only one fiber or also a plurality of fibers or filaments. The yarns can also be admixed and/or impregnated with friction-reducing or wear-reducing or mechanical-property-improving fillers.

The structural element 1 also has a base body 6. The base body 6 can have another material as the slide layer 2, e.g., steel. The base body 6 and the slide layer 2 can be adhered with each other or can be affixed to each other in another manner. In some exemplary embodiments, one side of the slide layer 5, which faces the other component 7, can be characterized as the slide surface. The slide layer 2 can have a thickness that is less than the entire thickness of the structural element 1. The slide layer 2 can be disposed, e.g., on only one and/or on a plurality and/or even on all outer surfaces of the structural element 1 and/or the base body 6.

In some other, not-illustrated exemplary embodiments, the base body 6 can possibly be omitted and the structural element 1 can be completely manufactured from the fiber-reinforced material of the slide layer 2. This can be the case when the structural element is not formed as a slide bearing bushing (sleeve), but rather as a slide bearing ring, linear guide or in another manner. In certain embodiments, the base body can also have another shape, e.g., the shape of a plate, a rail, a structural element having a guide groove or the like. In some other, not-illustrated exemplary embodiments, the adjacent component may be, e.g., a bearing ring, a shaft, a shaft housing, a housing, a bore, a carriage therefor or the like. The slide layer 2 would then be disposed, however, at least on the surface of the structural element 1 that would be arranged (located) to move relative to the other component. The structural element can be a slide bearing bushing (sleeve), a bearing ring, a slide rail, a slide surface, a structural element of a linear guide or the like.

In some embodiments, the slide layer 2 and/or the slide material can comprise the multi-component fiber 5 or the bi-component fiber as individual fibers or in a fiber-like manner. In the alternative, the slide layer 2 can also include additional reinforcing fibers of organic or inorganic origin; they can be, e.g., free of PTFE.

The arrangement of the two components or the structures 13 and 14 in the multi-component fiber 5 is variable. FIGS. 2*a* to 2*g* show schematic illustrations of cross-sections of multi-component fibers 5 for the structural element 1 and/or the slide layer 2 according to additional exemplary embodiments.

In the multi-component fiber 5 of FIG. 2*a*, the structures 13 and 14 each have a semi-circle shaped cross-section and are arranged so that they complete a full circle. This arrangement is also characterized as a side-by-side (S/S) bi-component fiber. In other exemplary embodiments, the structures 13 and 14 or even the fiber 4 itself can have other cross-sections, e.g., circular, square, rectangle or the like.

FIGS. 2*b* and 2*c* respectively show a multi-component fiber 5, in which the structures 13 and 14 are disposed with the first component as the sheath and the second component as the core (sheath-core fiber). In other words, it can be a matrix-core bi-component fiber, wherein PTFE can be disposed as one of the components in the core or sheath.

In the multi-component fiber 5 of FIG. 2*b*, the core or structure 14 is disposed concentric to the sheath and in FIG. 2*c* eccentric to the sheath. Also in the exemplary embodiments of FIGS. 2*b* and 2*c*, the structures 13 and 14 and the fiber 5 each have circular-shaped cross-sections. Naturally, it can also be in so-called sheath-core (S/C) bi-component fibers, which have the above-described alternative cross-sectional shapes.

In the exemplary embodiment of FIG. 2*d*, the multi-component fiber 5 is formed in a segmented pie manner. The structures 13 and 14 each have the shape of a circle segment and are disposed in an alternating manner. The multi-component fiber 5 comprises four first structures 13 and four second structures 14. In other exemplary embodiments, another number of structures can also be present.

In the exemplary embodiment of FIG. 2*e*, the multi-component fiber 5 is formed as a matrix-fibril (M/F) bi-component fiber. The first component in the first structure 13 is formed as the matrix and the second components in the second structure are formed as a plurality of fibrils. The matrix 14 of the multi-component fiber 5 differs or can be different from the matrix material 4 of the slide layer 2. This arrangement of the structures 13 and 14 can also be characterized as "islands-in-the-sea".

In the exemplary embodiment of FIG. 2*f*, the multi-component fiber 5 can be formed as a trilobal or tipped fiber structure. The fiber 5 thus has a star-shaped cross-section with three tips. The first component is thus disposed in the first structure 13 as the tips of the star, whereas the second component is disposed in the second structure 14 as a middle area of the star. In some other, not-illustrated exemplary embodiments, the star can also have a different number of tips.

Furthermore, the structures 13 and 14 can also be disposed in layers as segmented bands (segmented ribbons), as can be seen in FIG. 2*g*. The first structure 13 with the first component is disposed perpendicular to the main extension direction in the layers 13*a*, 13*b*, 13*c* and 13*d*, between each of which a layer of the second component is disposed as the second structures 14*b*, 14*c* or 14*d*. Additional layers, which lie outwardly perpendicular to the main extension direction, namely structures 14*a* and 14*e*, have a semi-circular-shaped cross-section. In some other, not-illustrated exemplary embodiments, the fiber 5 can also have another number of layers or the layers of other cross-sectional shapes.

In some exemplary embodiments, the slide layer 2 can also be present as a fabric-reinforced composite slide material having equally-dispersed PTFE and/or reinforcement material proportions in all directions, in particular in the thickness direction. A quasi-isotropic property profile in the thickness direction can thereby possibly be achieved, which can be suitable for compressive stress in certain embodiments. Moreover, a reduced PTFE material usage and thereby a cost-effective manufacture can be made possible in certain embodiments. By utilizing multi- or bi-component fibers, for example, having PTFE in the core as the first structure 13, as well as a reinforcement material in the shell as the second structure 14, PTFE-slide fabric-composite materials having good fiber-matrix adhesion, for example, can be manufactured in some exemplary embodiments. The fiber-matrix adhesion can be essential for ensuring the mechanical stability and tribological suitability of the composite material. Further, in certain embodiments, composite materials having bi-component fibers for slide applications according to exemplary embodiments can lead not only to improved slide properties, but also to strengthened abrasion resistance and thus to a lengthened service life of a bearing. In some embodiments, a linear wear characteristic after completion of the run-in phase can also result. This can, in certain embodiments, lead to a simplified mathematical describability, to a simplified prediction of the service life and/or to a more robust system.

FIGS. 3 to 6 show various exemplary embodiments of structural elements 1 having the slide layer 2. The slide layer 2 comprises the fiber-reinforced material according to one of the above-described exemplary embodiments.

Figure 3:
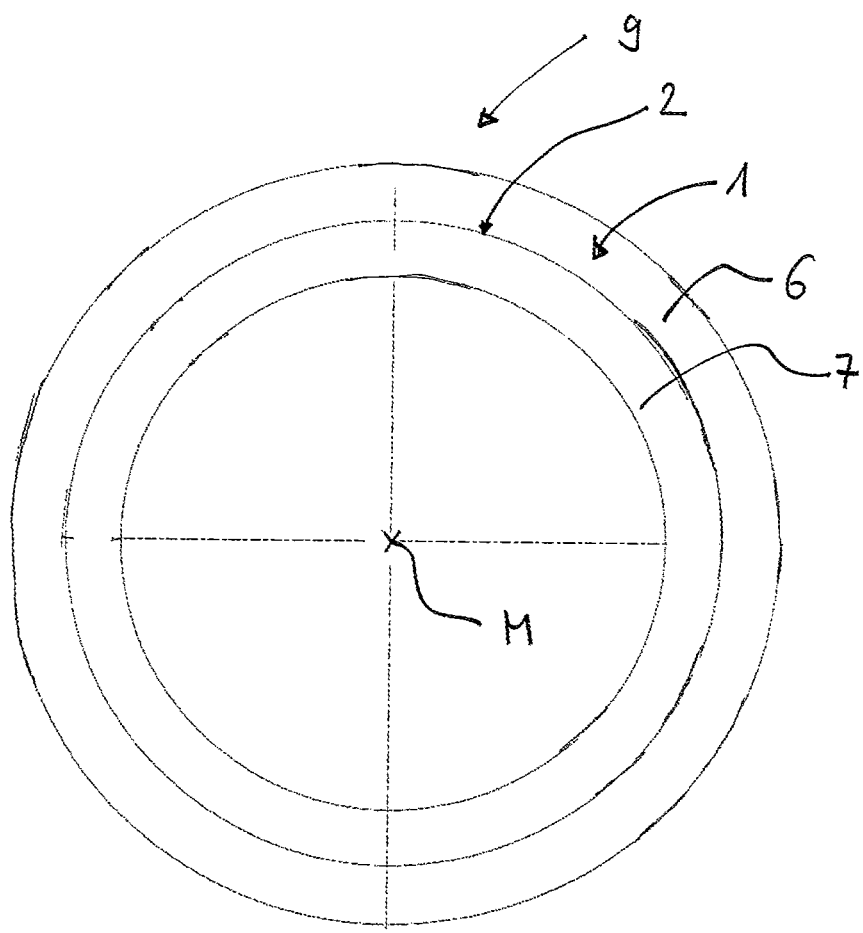
FIG. 3 shows a schematic illustration of a side view of a structural element, comprising at least one slide layer according to another exemplary embodiment.

FIG. 3 shows a schematic illustration of a side view of a structural element 1 having at least one slide layer 2 according to another exemplary embodiment. The structural element 1 is, in this case, formed as a bearing ring and, more precisely stated, as a bearing outer ring for a slide bearing 9. The slide layer 2 is disposed on a surface of the base body 6 that is directed radially-inward. The base body 6 as well as the slide layer 2 are each formed as hollow cylinders having a circular-cylindrical-shaped base surface. The structural element 1 configured as an outer ring slides via its slide layer 2 on an inner ring, which serves as the other component 7 in this case. In certain embodiments, the inner ring can also be formed as a structural element according to exemplary embodiments and can have a not-illustrated slide layer 2 on its side that is directed radially outward.

Figure 4:
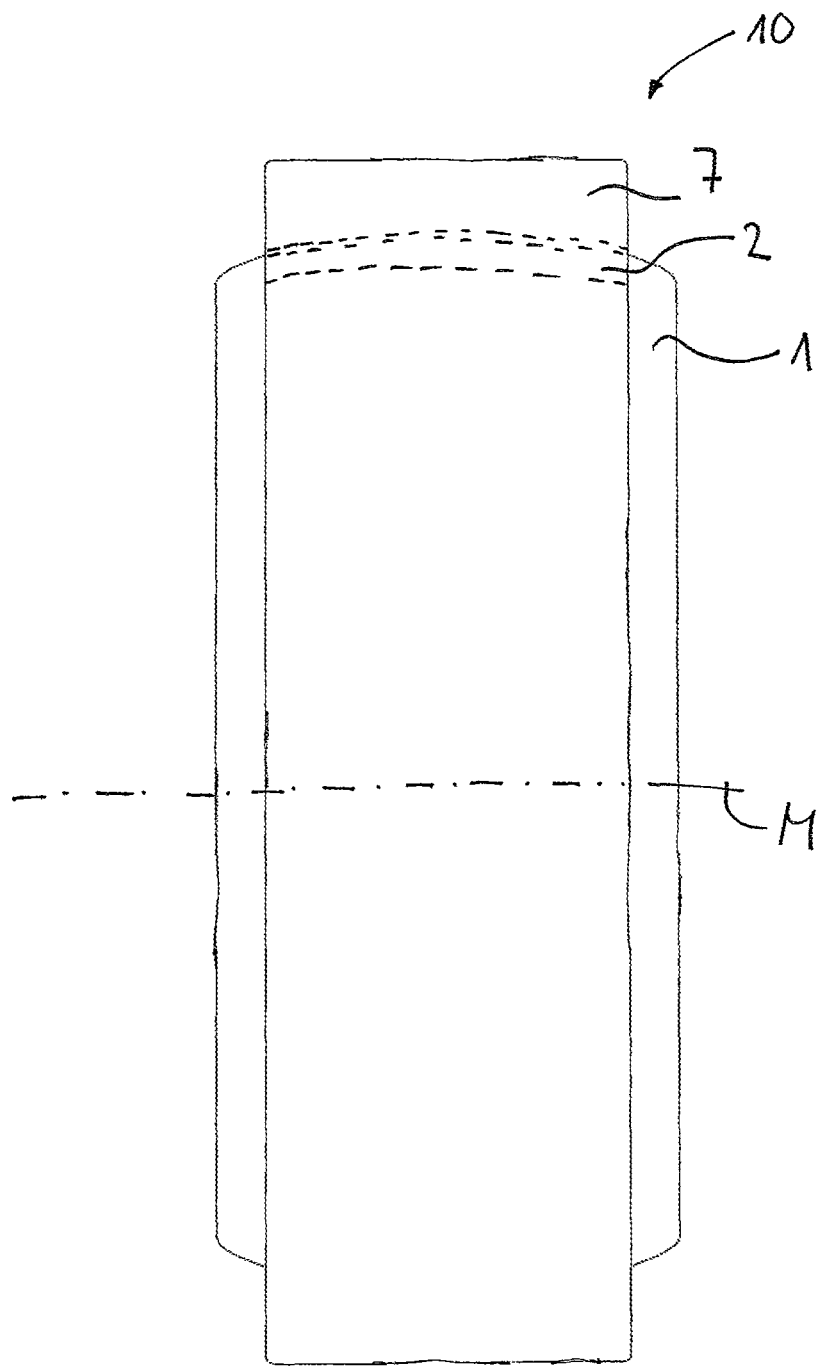
FIG. 4 shows a schematic illustration of a top view of a structural element, comprising at least one slide layer according to another exemplary embodiment.

FIG. 4 shows a schematic illustration of a top view of a structural element 1, comprising at least one slide layer 2 according to another exemplary embodiment, wherein the structural element is disposed in a spherical bearing 10 and serves as a spherical bearing inner ring. The structural element 1 and the slide layer 2 comprise a surface that is curved radially outward, so that the spherical bearing inner ring has, in a central region, a larger diameter in comparison to the regions lying farther outward in the axial direction M. The surface, which is curved radially outward, can also be formed spherical, dome-shaped or spherical bowl-shaped. The slide layer 2 is disposed, at least in one or more sections or completely, on a surface of the spherical bearing inner ring that is directed radially outward. The spherical bearing inner ring slides via its slide layer 2 relative to a spherical bearing outer ring that acts as the other component 7. The spherical bearing outer ring has a surface that is directed radially inward and that is formed as a negative to the slide layer 2 and is curved oppositely thereto. In this exemplary embodiment, the slide layer 2 is loaded in at least two directional components. In certain embodiments, the spherical bearing outer ring can also or only be formed as a structural element according to exemplary embodiments and can have a slide surface according to the exemplary embodiments on its surface that is directed radially inward. For example, the slide layer can be disposed in the outer ring.

FIG. 5 shows a schematic illustration of a side view of a structural element 1, comprising at least one slide layer 2 according to another exemplary embodiment, wherein the structural element 1 serves as a linear guide in a linear system. The structural element 1 slides via the slide layer 2 relative to the guide carriage serving as the other component 7. A characteristic dimension of the structural element 1 is, in this case, a length L of the linear guide.

In an analogous manner, the carriage can also be formed as a structural element 1 and can have a not-illustrated slide layer 2. A characteristic dimension of the structural element would be, in this case, a length K of the carriage. The structural element 1, in some exemplary embodiments, is not an intermediate product or semi-finished product, but rather is a finished structural element for the slide bearing.

The structural element having the slide layer according to exemplary embodiments can be utilized in any type of maintenance-free slide contacts, slide sleeves, thrust washers, spherical bearings, linear guides, slide bearings and/or linear systems.

Figure 6:
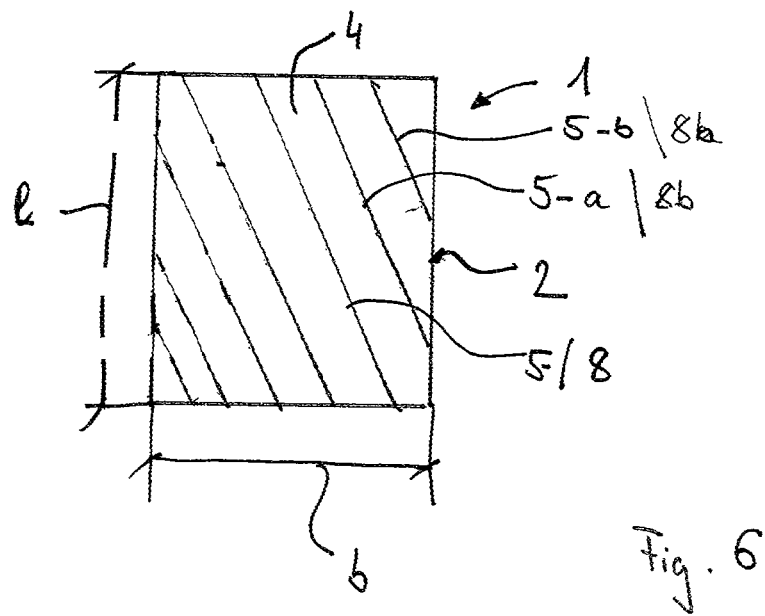
FIG. 6 shows a schematic illustration of a top view of a structural element, comprising at least one slide layer according to another exemplary embodiment.

FIG. 6 shows a schematic illustration of a top view of a structural element 1 having at least one slide layer 2 according to another exemplary embodiment. The structural element 1 and the slide layer 2 are substantially similar to those of the exemplary embodiment of FIG. 1, but differ in the arrangement of the at least one multi-component fiber 5. The fibers are continuous fibers, because they have a length that corresponds to a dimension of the slide layer 2 along a direction line 8, on which the multi-component fiber 5 is disposed. The dimension of the slide layer 2 along the direction line 8-a and thus the length of the fiber 5-a differ from the direction line 8-b and thus the length of the fiber 5-b. Because the fiber 5-a as well as the fiber 5-b completely run through in their directions, they are continuous fibers. In some other, not-illustrated exemplary embodiments, the direction line and/or the fiber can also be disposed parallel to a length 1 and/or to a breadth b of the slide layer 2. In some other, not-illustrated exemplary embodiments, the multi-component fiber 5 can also be disposed in another manner and/or can have a different length.

In some exemplary embodiments, the slide layer 2 is a fiber-reinforced, e.g., fabric-reinforced or alternatively a polymer composite material, produced in a winding process, for slide bearing applications. This can comprise a fiber, which is impregnated with a polymer matrix material. To manufacture the composite material, yarns or fibers comprised of polytetrafluoroethylene (PTFE)-bi-component fibers are used. Thus, fibers are used that comprise at least two components, namely PTFE and another reinforced component. This can, in certain embodiments, make possible a uniform distribution of the PTFE in the composite material, even in the vertical thickness direction. As a result, the mechanical properties, such as e.g., modulus of elasticity, strength, hardness, etc., of the composite material (for example, slide fabric) can be improved relative to conventional fiber-reinforced composite materials. Thus, an improved formation of a PTFE-transfer film in operation can also possibly be achieved. For example, such a composite material, in some exemplary embodiments, can facilitate the reduction of the amount of the expensive, high-performance synthetic material PTFE that is used, by partially replacing it with a cheaper standard material, without losing the desired friction-reducing effect of the PTFE. Such a composite material can possibly be used in maintenance-free applications or bearings and need not be supplementally lubricated with a lubricant.

The exemplary embodiments disclosed in the preceding description, the following claims and the appended figures, as well as their individual features, can be of significance and can be implemented in any arbitrary combination for the realization of an exemplary embodiment in its differing design.

In some other embodiments, features, which are disclosed as device features in other exemplary embodiments, can also be implemented as method features. Further, features, which are disclosed as method features in some exemplary embodiments, can also be implemented in other embodiments as device features.

The terms "materially-bonded" and "materially-bound" are intended to encompass, unless otherwise noted, all types of connections, bonds, attachments, etc., in which two or more materials are held together by atomic and/or molecular forces. Such connections, bonds, attachments, etc. can generally be separated only by destroying the connecting means. Representative, non-limiting examples of "material bonds" or "material bindings" include adhesion, soldering, welding, fusion and vulcanization.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved slide surfaces.

REFERENCE NUMBER LIST

1 Structural element
2 Slide layer
3 Line of motion
4 Matrix material
5 Multi-component fiber
6 Base body
7 Other component
8 Direction line
9 Slide bearing
10 Spherical bearing
11 Linear system
13 First structure
14 Second structure
b width/structural element slide bearing bushing
L length/structural element linear system
K length/structural element
L length/slide layer

We claim:

1. A structural element comprising:
at least one surface comprising a slide surface, the slide surface of the structural element being defined by a slide layer on the structural element, wherein:
the structural element is configured to slide via the at least one slide surface along at least one line of motion,
the slide layer comprises a fiber-reinforced material,
the fiber-reinforced material includes at least one multi-component fiber embedded in an epoxy resin matrix,
the multi-component fiber including at least one first component, which is disposed in at least one first structure, and at least one second component, which is disposed in at least one second structure,
the first and second structures are materially-bonded together and are disposed parallel to each other in a main extension direction of the at least one multi-component fiber,
either the first component or the second component is polytetrafluoroethylene, and
the structural element is formed as a bearing ring, a slide bearing bushing, a linear guide or a spherical bearing ring.

2. The structural element according to claim 1, wherein the at least one multi-component fiber has a length that is greater than 1% of a characteristic dimension of the slide layer along the line of motion.

3. The structural element according to claim 1, wherein the at least one multi-component fiber has a diameter between 3 μm and 30 μm.

4. The structural element according to claim 1, wherein the at least one multi-component fiber is disposed in a yarn that has a linear mass density between 200-1200 dtex.

5. The structural element according to claim 1, wherein the first structure and the second structure have the same cross-section.

6. The structural element according to claim 1, wherein the first component is embedded in the second component.

7. A structural element comprising at least one slide layer, wherein:
the structural element is formed to slide via the at least one slide layer along at least one line of motion,
the slide layer comprises a fiber-reinforced material,
the fiber-reinforced material includes at least one multi-component fiber that includes at least one first component, which is disposed in or on at least one first structure, and at least one second component, which is disposed in or on at least one second structure,
the first and second structures are materially-bonded together and are disposed parallel to each other in a main extension direction of the at least one multi-component fiber, and
either the first component or the second component is polytetrafluoroethylene,
wherein the first component is disposed perpendicular to its main extension direction in at least two layers that accommodate between them at least one layer of the second component.

8. The structural element according to claim 1, wherein the first component is disposed in or on at least one tip and/or corner of a cross-section of the at least one multi-component fiber and the second component is disposed in a medial cross-section dimension of the at least one multi-component fiber.

9. The structural element according to claim 1, wherein the at least one multi-component fiber comprises a plurality of multi-component fibers embedded in the epoxy resin matrix.

10. The structural element according to claim 9, wherein the second component comprises polyamide (PA), polypropylene (PP), polycarbonate (PC) and/or polyester (PES).

11. The structural element according to claim 10, wherein the at least one multi-component fiber has an aspect ratio of at least 1000.

12. A structural element comprising at least one slide layer, wherein:
the structural element is formed to slide via the at least one slide layer along at least one line of motion,
the slide layer comprises a fiber-reinforced material,
the fiber-reinforced material includes at least one multi-component fiber that includes at least one first component, which is disposed in or on at least one first structure, and at least one second component, which is disposed in or on at least one second structure,
the first and second structures are materially-bonded together and are disposed parallel to each other in a main extension direction of the at least one multi-component fiber, and
either the first component or the second component is polytetrafluoroethylene,
wherein the at least one multi-component fiber has a length that is greater than 1% of a characteristic dimension of the slide layer along the line of motion,
wherein the at least one multi-component fiber has a diameter between 3 μm and 30 μm,
wherein the at least one multi-component fiber is disposed in a yarn that has a linear mass density between 200-1200 dtex, and
further comprising a polymer matrix bonded to the yarn, wherein the polymer matrix comprises an epoxy resin.

13. The structural element according to claim 12, wherein the at least one multi-component fiber has a length that is greater than 30% of the characteristic dimension of the slide layer along the line of motion.

14. The structural element according to claim 13, wherein the structural element is an annular slide bushing and further comprises glass fibers.

15. The structural element according to claim 14, wherein the at least one multi-component fiber is a continuous fiber that extends along the entire characteristic dimension of the annular slide bushing.

16. The structural element according to claim 15, wherein the at least one multi-component fiber has a cross-section of a star and the polytetrafluoroethylene disposed at, in or on tips of the star.

17. The structural element according to claim 1, wherein the structural element is formed as a bearing ring or a slide bearing bushing.

18. The structural element according to claim 1, wherein the first component comprises polytetrafluorethylene and the second component is polytetrafluorethylene-free.

19. The structural element according to claim 1, wherein the first and second structures are directly materially bonded together.

20. The structural element according to claim 12, wherein the first and second structures are directly materially bonded together and wherein the first component comprises polytetrafluorethylene and the second component is polytetrafluorethylene-free.

* * * * *